(12) United States Patent
Carey et al.

(10) Patent No.: US 6,714,793 B1
(45) Date of Patent: Mar. 30, 2004

(54) METHOD AND SYSTEM FOR INSTANT MESSAGING ACROSS CELLULAR NETWORKS AND A PUBLIC DATA NETWORK

(75) Inventors: Charles A. Carey, Kirkland, WA (US); Bruce A. Robinson, Maple Valley, WA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/519,525

(22) Filed: Mar. 6, 2000

(51) Int. Cl.$^7$ ................................................. H04Q 7/20
(52) U.S. Cl. .......................... 455/466; 455/414; 455/412
(58) Field of Search .................. 455/466, 517, 455/426, 414, 412, 458, 415; 340/7.1, 7.2, 7.21, 7.23, 7.29, 7.51, 7.52, 7.53; 709/204, 206, 210

(56) References Cited

U.S. PATENT DOCUMENTS

| | | | |
|---|---|---|---|
| 5,025,252 A | | 6/1991 | DeLuca et al. ......... 340/825.44 |
| 5,459,458 A | * | 10/1995 | Richardson et al. ... 340/825.44 |
| 5,678,179 A | * | 10/1997 | Turcotte et al. ............. 455/331 |
| 5,697,060 A | * | 12/1997 | Akahane .................... 340/38.1 |
| 5,802,466 A | * | 9/1998 | Gallant et al. .............. 455/413 |

(List continued on next page.)

FOREIGN PATENT DOCUMENTS

| | | | | |
|---|---|---|---|---|
| EP | 889660 A2 | * | 1/1999 | ............ H04Q/7/22 |
| WO | WO-00/42791 | * | 7/2000 | ............ H04Q/7/24 |
| WO | WO 01/69406 | * | 9/2001 | ............ G06F/15/16 |

OTHER PUBLICATIONS

IM means business IEEE spectrum Nov. 2002.*
Sep. 13, 1999 Business wire Atmobile corporation 2 pages.*
Sep. 1, 1999 business Information coropartion Sep. 1, 1999 @mobile.com enters 'IM' world. 1 page.*
SproWuest Wireless Instant messaging (Nov. 22, 1999) InfoSpace .com. pp. 1–2.*
Nweswier NY Dec. 8, 1999 Atmobile corp. pp. 1–2.*
Nextel announces On–line paging service provided by wireless services—first werieless telephone messaging Service to Offer Devlivery confirmation. NY Aug. 12, 1998.*

*Primary Examiner*—Nay Maung
*Assistant Examiner*—Tilahun Gesesse
(74) *Attorney, Agent, or Firm*—Black Lowe & Graham PLLC

(57) ABSTRACT

A method, system and computer program product for instant message communication in a wireless and non-wireless environment. A message is sent from a mobile unit device over a wireless communication network. The message includes a destination address, information associated with the mobile unit device's user, message content and message address. If, according to information previously stored for the mobile unit device's user at the instant message system, the destination address is associated with an instant message function, the associated instant message function is executed at the instant message system using the information contained in the message content, if required as determined by the associated instant message function. If, according to information previously stored for the mobile unit device's user at the instant message system, the destination address is associated with an instant message name, an instant message is created according to the message content and is sent to the user with the associated instant message name. For instant messages sent or received by a mobile unit device with known buddies, the instant message is optimized by tagging the instant message with a routing phone number that is unique to the mobile unit device and buddy combination, whose identity is stored both in the mobile unit device address book and in the instant message routing server.

16 Claims, 11 Drawing Sheets

U.S. PATENT DOCUMENTS

| | | | |
|---|---|---|---|
| 5,878,397 A | * 3/1999 | Stille et al. | 704/466 |
| 5,903,726 A | * 5/1999 | Donovan et al. | 455/461 |
| 5,960,074 A | * 9/1999 | Clark | 379/310 |
| 5,966,663 A | 10/1999 | Gleason | 455/466 |
| 6,014,429 A | 1/2000 | LaPorta et al. | 379/88.15 |
| 6,067,529 A | * 5/2000 | Ray et al. | 706/26 |
| 6,112,078 A | * 8/2000 | Sormunen et al. | 455/411 |
| 6,115,605 A | * 9/2000 | Siccardo et al. | 455/426 |
| 6,134,432 A | * 10/2000 | Holmes et al. | 455/412 |
| 6,138,158 A | * 10/2000 | Boyle et al. | 709/225 |
| 6,178,331 B1 | * 1/2001 | Holmes et al. | 455/466 |
| 6,212,548 B1 | * 4/2001 | DeSimone et al. | 709/204 |
| 6,237,027 B1 | * 5/2001 | Namekawa | 709/206 |
| 6,301,609 B1 | * 10/2001 | Aravamudan et al. | 709/207 |
| 6,430,604 B1 | * 8/2002 | Ogle et al. | 709/207 |
| 6,512,930 B2 | * 1/2003 | Sandegren | 455/518 |

* cited by examiner

METHOD AND SYSTEM FOR INSTANT MESSAGING ACROSS CELLULAR NETWORKS AND A PUBLIC DATA NETWORK

FIELD OF THE INVENTION

The present invention generally relates to non-voice message transmission and reception across cellular and public or private data networks and, more particularly to a method and system for message delivery between a cellular and public data network.

BACKGROUND OF THE INVENTION

Around the world, tens of millions of users are using software that enables them to be alerted when friends, family and colleagues go on-line for the real-time exchange of messages. A commonly used term for this type of real-time exchange is instant messaging. Instant messaging is cheap, with most vendors giving away the product and others charging nominal licensing fees. It is also powerful, allowing users to communicate in one window while, for example, looking over a document in another. Team members in different locations can set up impromptu conversations, bouncing ideas and strategies off each other. It provides quick and dirty collaboration, with little to buy and not much to set up.

The best known instant messaging system is America Online's Instant Messenger (AIM) that was originally designed as a feature for AOL's pay service. AIM is software that anyone with an Internet connection can download, whether they are an AOL member or not. After registering a screen name, the user can maintain lists of AOL members and other AIM users, and be alerted whenever one of those in the list comes on-line. When one of those in the list comes on-line, the corresponding screen name appears in an AIM interface window on the screen. By clicking on the name appearing in the AIM interface window, the user may then send an instant message and initiate a conversation session. Users can also sort their buddies into groups. For example, a lawyer could create separate groups for partners, associates, in-house counsel and adversaries.

Other vendors, such as Yahoo, PeopleLink, Mirabilis (ICQ) and Activerse, offer similar instant message service.

Despite the apparent success of instant messaging systems, it is still limited to a user accessing the service through computer-based systems hardwired to the Internet. There exists a need to provide the benefits of instant messaging, immediate knowledge of another online status and real-time text communication, outside of hardwired Internet systems. Specifically in a wireless environment, it would be advantageous to know if a subscriber has turned on their cellular phone. It would also be advantageous to communicate via text messages, which are far less costly than voice communications because text message data uses up much less bandwidth or resources than voice data.

SUMMARY OF THE INVENTION

The present invention provides a method, system and computer program product for instant message communication in a wireless and non-wireless environment. First, a message is sent from a mobile unit device over a wireless communication network. The message includes a destination address, information associated with the mobile unit device's user, message content and message address. If, according to information previously stored for the mobile unit device's user at the instant message system, the destination address is associated with an instant message function, the associated instant message function is executed at the instant message system using the information contained in the message content, if required as determined by the associated instant message function. If, according to information previously stored for the mobile unit device's user at the instant message system, the destination address is associated with an instant message name, an instant message is created according to the message content and is sent to the user with the associated instant message name.

In accordance with another aspect of the present invention, if said instant message function is a sign on function, an instant message session is initiated according to prestored user profile information and the message content. The message content is an instant message name associated with the user of the mobile unit device and a predefined password.

In accordance with still another aspect of the present invention, the status information of users associated with instant message names stored for the user of the mobile unit device in the instant message system are determined and sent to the mobile unit device of the user. The user's mobile unit device then presents the sent status information.

In accordance with yet another aspect of the present invention, if said instant message function is a sign off function, the instant message session associated with the mobile unit device's user is ended.

In accordance with still yet another aspect of the present invention, if said instant message function is a delete instant message name function, the stored instant message is deleted according to the message content. The message content is at least one instant message name.

In accordance with still another aspect of the present invention, if said instant message function is an update instant message name function, the status information of users associated with instant message names stored for the user of the mobile unit device in the instant message system are determined and sent to the mobile unit device of the user. The user's mobile unit device then presents the sent status information.

In accordance with further aspects of the present invention, an instant message name is associated with a destination address at the instant message system. This association is saved in memory in the instant message system according to a registered user of a mobile unit device. An executable address loading program is generated according to the saved association and then sent through the wireless environment to the mobile unit device of the registered user. At the mobile unit device the executable address loading program is executed, thereby entering the associated instant message name and address into memory.

In accordance with still further aspects of the present invention, an instant message is processed according to sender user information stored at the instant message system if it is intended for a recipient user signed on through a mobile unit device and then sent through the wireless environment to the mobile unit device of the recipient user. The user's mobile unit device presents the sent instant message and the instant message name of the creator of the instant message.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
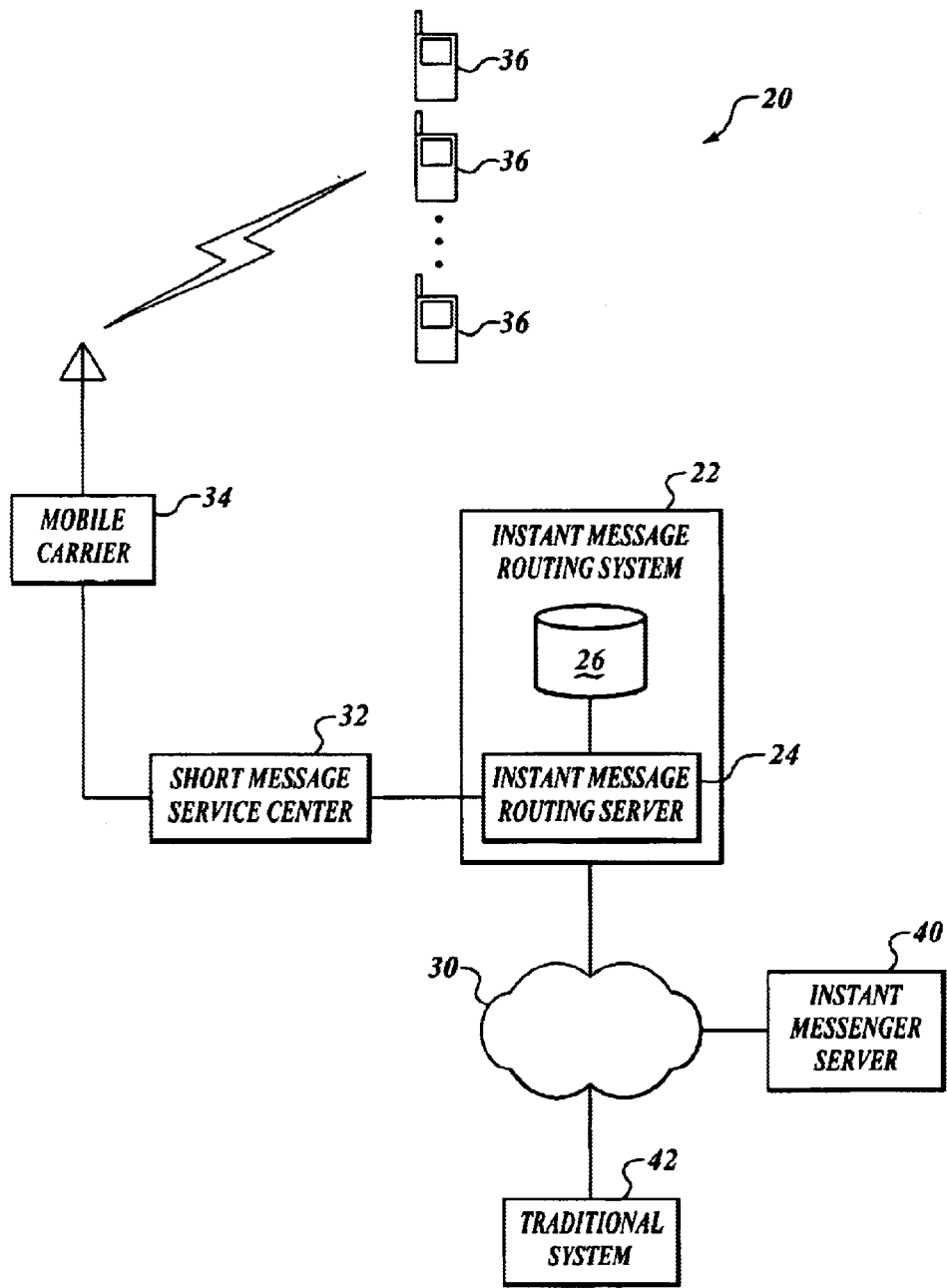
FIG. 1 is a block diagram of the components of the present invention.

The present invention is an integrated wireless and traditional instant messaging system and method. As shown in FIG. 1, the system 20 includes a instant message routing system 22 that includes a routing server 24 and a database 26 for storing a profile for each subscribing user. Each user profile includes a list of instant message names with each name assigned to an address (phone number). The routing server 24 is in communication with one or more short message service centers (SMSC) 32 that is in communication with one or more wireless mobile carriers 34. Each wireless mobile carrier 34 supports subscribing users operating mobile unit devices 36, such as a hand-held cell phone, a bag phone or a vehicle phone. The routing server 24 is also coupled to a public or private data network 30, such as the Internet. Also coupled to the public or private data network 30 are an instant message server 40 and one or more traditional systems 42, such as a personal computer.

The communication link between the routing server 24 and the short message service center 32 is also either a public or private data network, such as the Internet or a private dedicated circuit. A protocol residing over the communication link defines the structure of information communicated between the routing server 24 and the short message service center 32. Preferably this link is the Internet with TCP/IP operating thereon. Operating over TCP/IP is another protocol that allows the routing server 24 to identify the effectiveness of communications to the mobile unit devices 36. An example protocol residing over TCP/IP is the short message peer-to-peer (SMPP) protocol or configuration or data management procedure (CDMP) protocol. These protocols provide visibility of the status of message deliveries to the mobile unit devices 36.

A data bearer protocol defines the structure of data messages communicated between the mobile unit devices 36, the mobile carrier 34 and the short message service center 32. The global system for mobile communications (GSM) environment, used as the primary digital wireless standard throughout Europe, uses the short message service (SMS) standard data bearer protocol for formatting data for delivery between the mobile unit devices 36, wireless mobile carrier 34 and the short message service center 32. The SMS protocol describes the format of data, called SMS packages, sent or received through the system. In accordance with the present invention, the format of data messages, i.e. SMS package, sent from the mobile unit device includes the phone number of the mobile unit device, a destination phone number, the short message service center address (preferably a number), a validity period value and message content. The validity period value informs the short message service center 32 how long to attempt delivery. Each data message (SMS package) is preferably a single block of information. As can be readily appreciated by those of ordinary skill in the art of wireless communication, the SMS package may be divided up into multiple packets of data and sent at various intervals.

Figure 2:
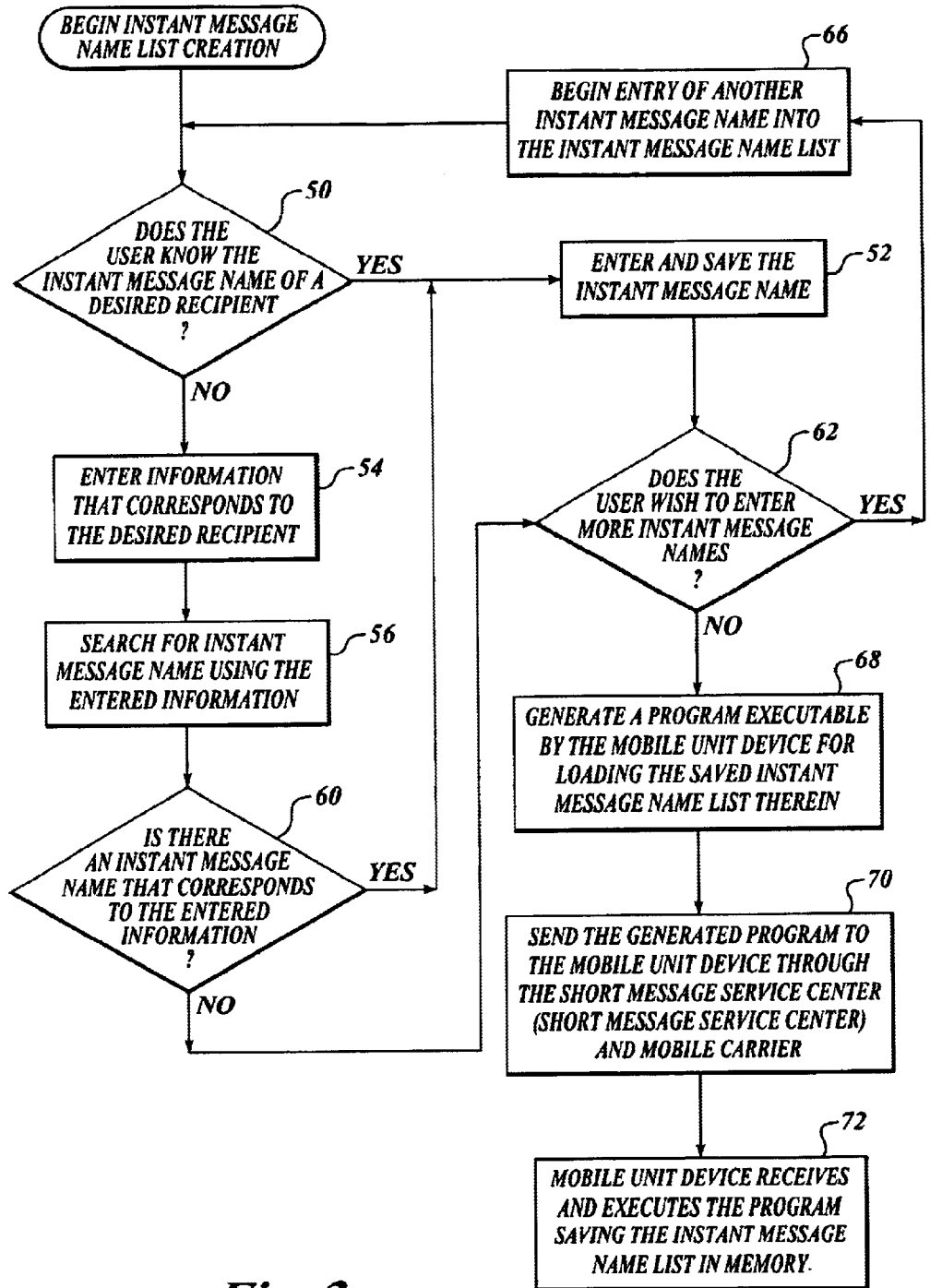
FIG. 2 is a flow diagram of a process of entering instant message names formed in accordance with the present invention.
Figure 3:
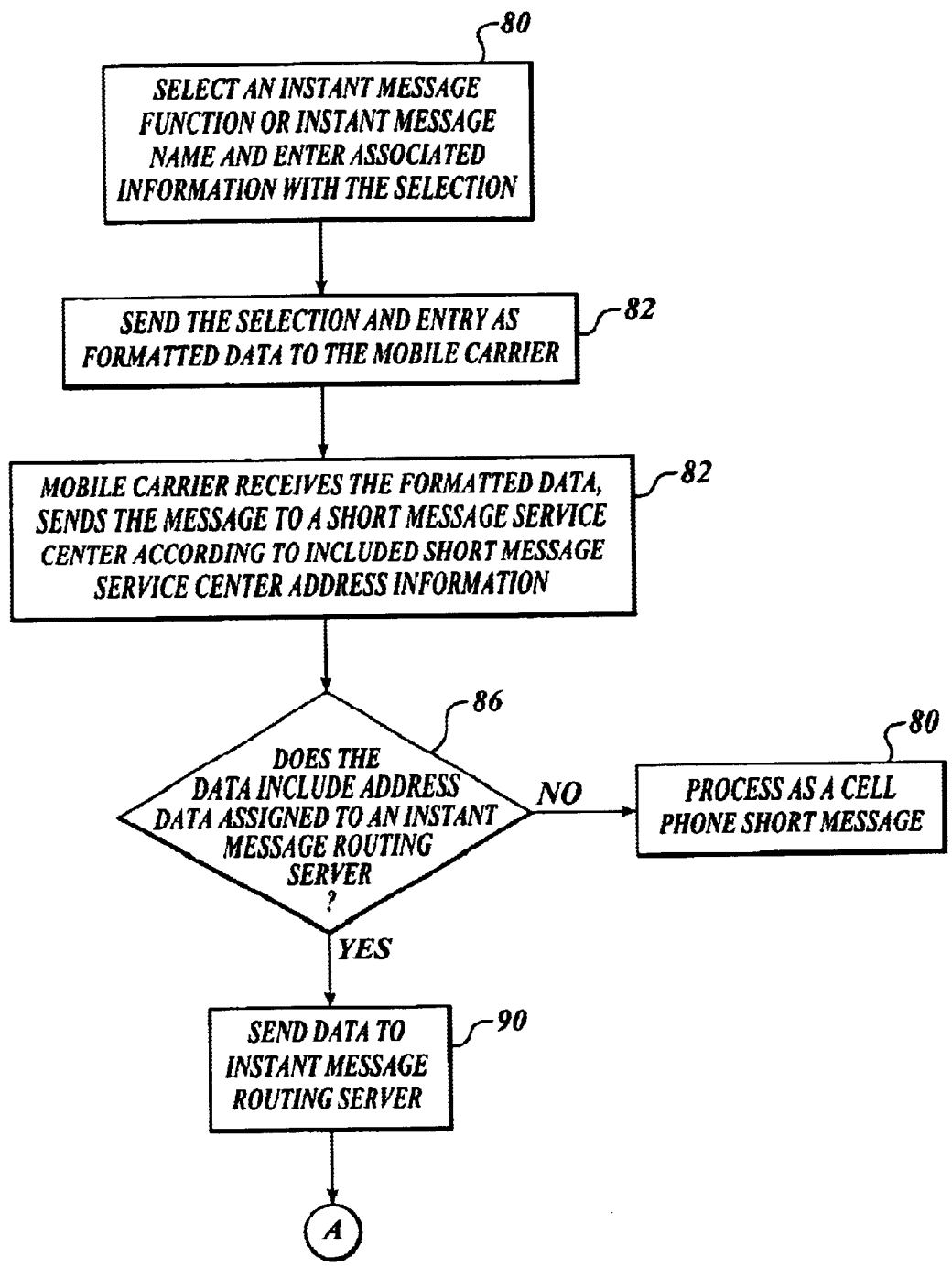
FIGS. 3–7 are flow diagrams of the formed in accordance with the present invention.

FIG. 2 illustrates a method for remotely creating an instant message name list for a cellular phone. First, a user, who is a subscriber to a wireless instant message service, uses a traditional system 42 coupled to the network 30 to sign on to a web site supported or generated by the routing server 24. A user becomes a subscriber by completing a registration process that can be performed during online communication with either servers 24 or 40 or through other means, such as e-mail, conventional mail or telephonic communication. Once the user has entered into the routing server's web site by preferably completing a sign-on or logon with password verification, the user begins instant message name list (i.e. buddy list) creation for the user's mobile unit device 36. If the cell phone user knows the instant message name that corresponds to a desired recipient, decision block 50, the user enters the instant message name. The entered instant message name is then saved in a look-up table at a location in the database 26, block 52. The look-up table is stored in relation to predefined user profile information. Each instant message name stored in the look-up table has a corresponding destination address, preferably a phone number. For example, the routing server 24 receives from the mobile carrier 24 or a telecommunications controlling agency a set of n telephone numbers. In the database 26 for each user profile, the server 24 associates a number from the set of n telephone numbers to an entered instant message name. As a result, the routing system 22 reuses a limited number of phone numbers.

If the cell phone user does not know the instant message name that corresponds to a desired recipient, decision block 50, the user enters information that corresponds to the desired recipient, such as an e-mail address, block 54. The server hosting the name list creation website then searches for an instant message name that corresponds to the entered information, block 60. If, at decision block 60, there is a corresponding instant message name, the corresponding instant message name is entered and saved, see block 52 above. If, at decision block 60, the search fails to find a corresponding instant message name, no name entry occurs and the user is given the opportunity to enter more instant message names, decision block 62. The user is also given the opportunity to enter more instant message names, decision block, after block 52.

If, at decision block 62, the user does not wish to enter more instant message names, a program is generated by the server hosting the name list creation website for programming the created instant message name list into the user's mobile unit device 36, block 68. Next, at block 70, the generated program is sent through the short message service center 32, where it is formatted according to the proper protocol, and then through the mobile carrier 34 to the user's mobile unit device 36. At block 72, the user's mobile unit device 36 receives and executes the program, thus saving the instant message name list in an address book stored in memory. In other words, the mobile unit device is programmed in an over-the-air-programming manner to include the instant message name list within the mobile unit device's instant message listings (i.e. address book).

In an alternative embodiment, if the mobile carrier 34 and corresponding mobile unit devices 36 do not include the hardware or software components for receiving and executing the program for loading the saved instant message name list, the loading of instant message names and corresponding phone numbers that are stored at the routing system 22 are manually entered into the address book of the user's mobile unit device 36.

FIGS. 3–7 illustrate the process of instant message function delivery, message delivery and instant message reception using a mobile unit device across a wireless and non-wireless network. First, at block 80 of FIG. 3, through a user interface on the mobile unit device 36 the user selects an instant message function or an instant message name(s) from the mobile unit device's address book based on the latest stored instant message name status information received from the instant message name routing server 24 as a result of a sign on, a status update or the last communication with the instant message routing server 24 (see FIG. 5 below). Then, the user enters message content information (either function related information or a message accordingly). Alternatively, the message content information is entered first, then an instant message function or an instant message name is selected. Examples of user interaction with the instant message routing server 24 and with the mobile unit device 36 are illustrated by example in FIGS. 8–14 below. Next, at block 82, the user's selection and entered information is formatted according to the predefined protocol and sent to the mobile carrier 34. At block 84, the mobile carrier 34 receives the formatted data and sends the formatted data to a short message service center 32 according to the included short message service center address information. At decision block 86, the short message service center 32 determines if the received formatted data includes address data assigned to an instant message routing server 24, i.e. an address field or phone number. If the formatted data does not include address data assigned to an instant message routing server 24, the formatted data is probably an email message and is processed according to known cellular Short Message processing methods, block 88. Also commonly referred to as email for cell phones. If the formatted data does include address data assigned to an instant message routing server 24, the formatted data is reformatted according to the predefined protocol used to communicate information between the short message service center 32 and the instant message routing server 24 and then sent to the instant message routing server 24, block 90.

Figure 4:
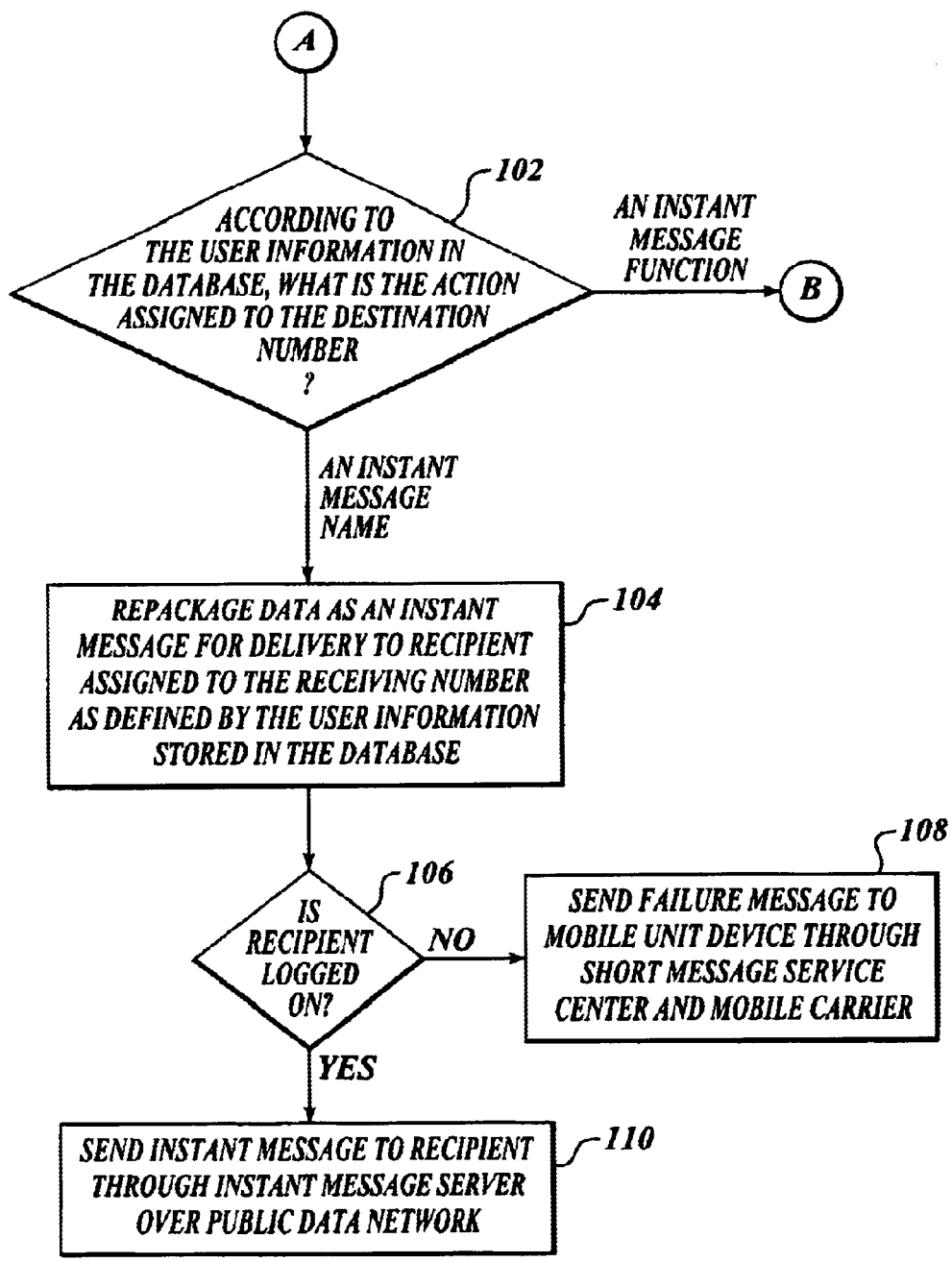

As shown in FIG. 4, at decision block 102, the instant message routing server 24 compares the destination number included in the reformatted data to the look-up table in the user profile location in the database 26 that corresponds to the mobile unit device phone number included with the received data. The comparison determines what action corresponds to the destination number. If the action corresponding to the destination number is an instant message function, the instant message routing server 24 executes the instant message function, see FIG. 5 below. If the action corresponding to the destination number is an instant message name, the instant message routing server 24 repackages the formatted data as an instant message and sends it to the recipient associated with instant message name, block 104. Before or after the repackaging occurs, the instant message routing server 24 determines if the recipient that corresponds to the instant message name is signed on to the instant message system, i.e. the instant message server 40, decision block 106. If the recipient is not signed on, the instant message routing server 24 sends a failure message to the user's mobile unit device 36 through the short message service center 32 and mobile carrier 34, block 108. In a first alternate embodiment, if the recipient is not signed on, the instant message server 40 stores the instant message until the instant message server 40 detects that the recipient has signed on through an instant message routing server 24 or a traditional system 42. In a second alternate embodiment, if the recipient is not signed on, the instant message is forwarded to a previously designated e-mail address.

If the recipient is signed on, the instant message routing server 24 sends the instant message to the recipient through the instant message server 40 over the network 30, block 110. The process of sending an instant message to a mobile unit device recipient is described in more detail below in FIGS. 6 and 7.

Figure 5:
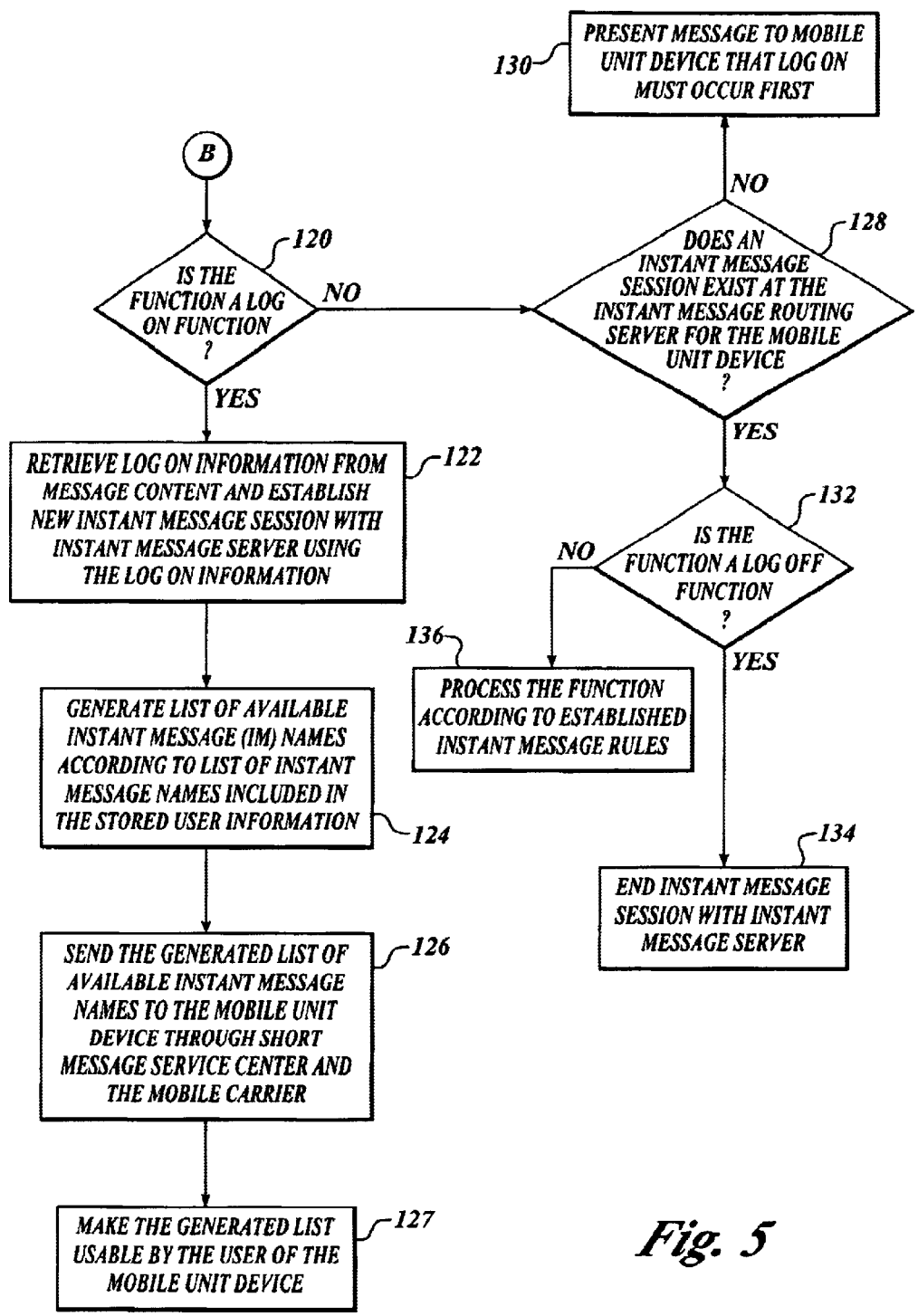

FIG. 5 illustrates the process of processing data received from a mobile unit device 36 that corresponds to an instant message function, from B of FIG. 4. First, at decision block 120, if the function is a sign on function, the instant message routing server 24 establishes a new instant message session with the instant message server 40 for the user associated with the mobile unit device 36 that send the sign on function. The establishment of a new instant message session is done in accordance with the proper password(s) that was included in the message content sent from the mobile unit device 36, block 122. The instant message routing server 24 checks with instant message server 40 to determine which of the names in the instant message name list associated with the user and stored in the database 26 are available or signed on, block 124. This determination of who is available is then sent to the mobile unit device 36 through the short message service center 32 and the mobile carrier 34, block 126. Once the mobile unit device 36 receives the availability determination, the device 36 process it and makes the availability information available for use by the user, block 127.

If the instant message function is not the sign on (sign on) function and if no instant message session is presently active for the user at the instant message routing server 24, decision block 128, a message informing the user that sign on must occur first is presented, block 130. If an instant message session exists and the function is a sign off (sign off) function, decision block 132, the instant message routing server 24 ends the corresponding instant message session, block 134. However, if the function is not the sign off function, the function is processed according to instant message rules, block 136. The following other functions are available: delete; add; and check status. With regards to the delete function, the instant message routing server 24 deletes each instant message name included in the message content from the instant to message name list stored with the user's profile information in the database 26. With regards to the add function, the instant message routing server 24 adds each instant message name included in the message content to the instant message name list stored with the user's profile information in the database 26. During instant message session the instant message routing server 24, like an instant message session on a traditional system 42, continually receives connection status information of each instant message name in the instant message name list. With regards to the check status function, the instant message routing server 24 sends the latest received connection status information to the mobile user device 36 through the short message service center 32 and the mobile carrier 34.

Figure 6:
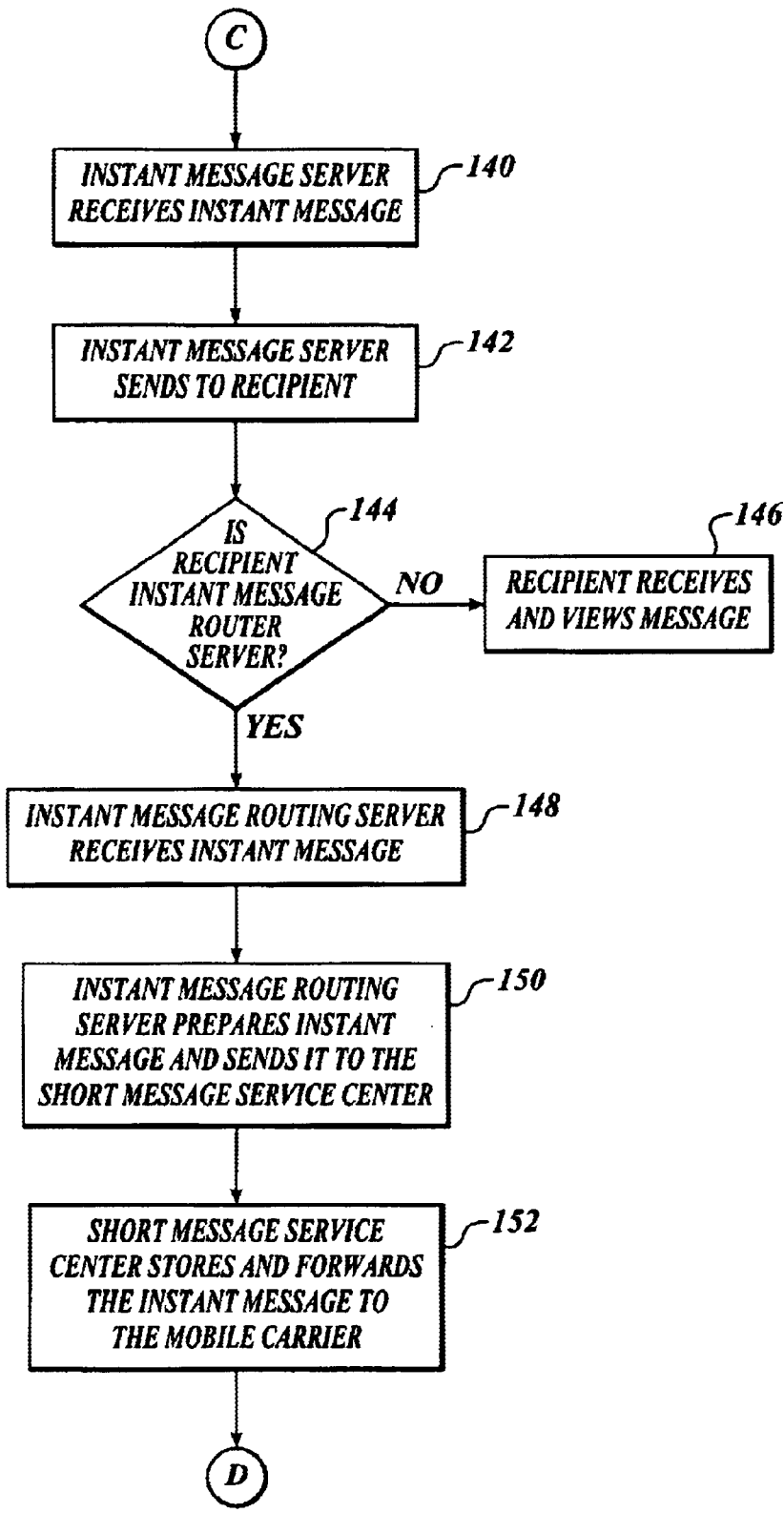
Figure 7:
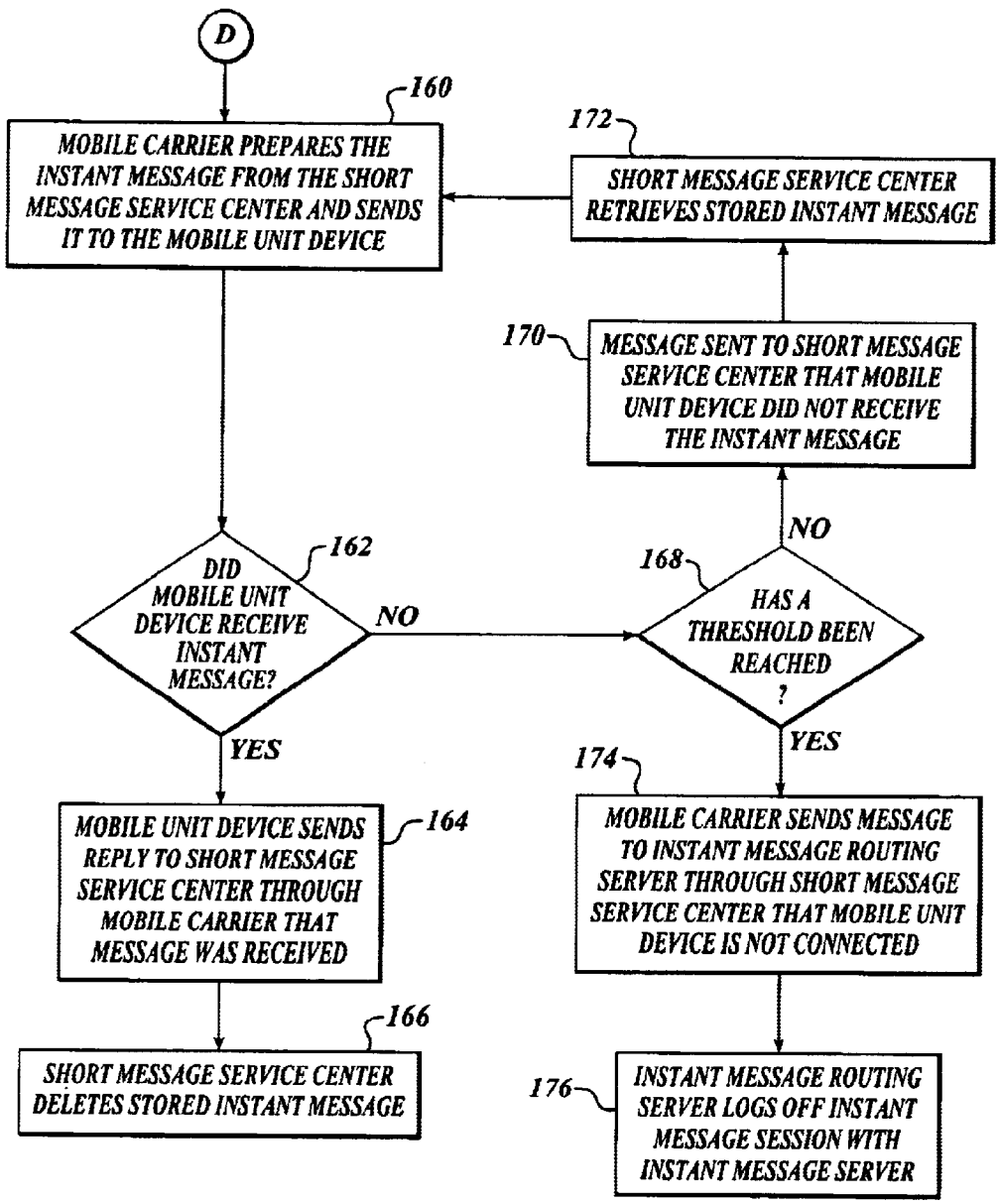

FIGS. 6 and 7 illustrate the process of sending an instant message to a recipient signed on to the instant message service from a mobile unit device 36 through an instant message routing server 24. The process of FIG. 6 occurs when an instant message is sent from another user of a mobile unit device 36, C from FIG. 4, or from a user of a traditional system 42, such as a desktop or laptop computer.

First, at block 140, the instant message server 40 receives an instant message and, at block 142, sends it to the signed on recipient identified in the instant message. If, at decision block 144, the recipient is a normal instant message recipient, i.e. not a recipient with an instant message session active through the instant message routing server 24, the recipient receives and views the instant message as per instant message procedures, block 146. If, on the other hand, at decision block 144, the recipient is a user with an instant message session active through the instant message routing server 24, the instant message routing server 24 receives the instant message, block 148. Then, at block 150, the instant message routing server 24 prepares the received instant message according to the predefined protocol and sends the prepared instant message to the short message service center 32, where the short message service center 32 stores and forwards the instant message to the mobile carrier 36 according to the predefined wireless protocol, block 152.

As shown in FIG. 7, at block 160, the mobile carrier 36 prepares the instant message received from the short message service center 32 for transmission and sends the prepared transmission to the mobile unit device 36. If, at decision block 162, the mobile unit device 36 successfully receives the prepared transmission of the instant message, the mobile unit device 36 replies to the short message service center 32 that the transmission was received, block 164. Then, at block 166, the short message service center 32 receives the mobile unit device's successful reply and deletes the stored instant message.

If, however, at decision block 162, the mobile unit device 36 did not successfully receive the prepared transmission of the instant message and if, at decision block 168, a transmission delivery threshold has not been reached, a message is sent to the short message service center 32 that the mobile unit device 36 did not successfully receive the instant message, block 170. This message of unsuccessful reception is sent by the mobile carrier 34. When the short message service center 32 receives a message of unsuccessful reception, the short message service center 32 retrieves the stored instant message that corresponds to the unsuccessfully sent transmission and resends the transmission to the mobile unit device 36 through the mobile carrier 34, blocks 172 and 160.

Again, at decision block 162, if the mobile unit device 36 did not successfully receive the prepared transmission of the instant message and if, at decision block 168, a transmission delivery threshold has been reached, the mobile carrier 34 sends a message to the instant message routing server 24 through the short message service center 32 that the mobile unit device 36 is not connected or not receiving instant messages, block 174. When the instant message routing server receives a message of this type, the instant message routing server 24 signs off or logs off the instant message session associated with the user of the mobile unit device 36 that failed to receive the transmission, block 176. The transmission delivery threshold is preferably a predefined number of delivery attempts. Once the number of attempts have been reached or exceeded, the mobile carrier 34 assumes the mobile user device 36 is off or out of reception range. It can be readily appreciated by those of ordinary skill in the art of cell phone communication, that various data delivery methods can be used for insuring information gets delivered during temporary periods of time when the cell phone is out of communication with the mobile carrier.

Figure 8:
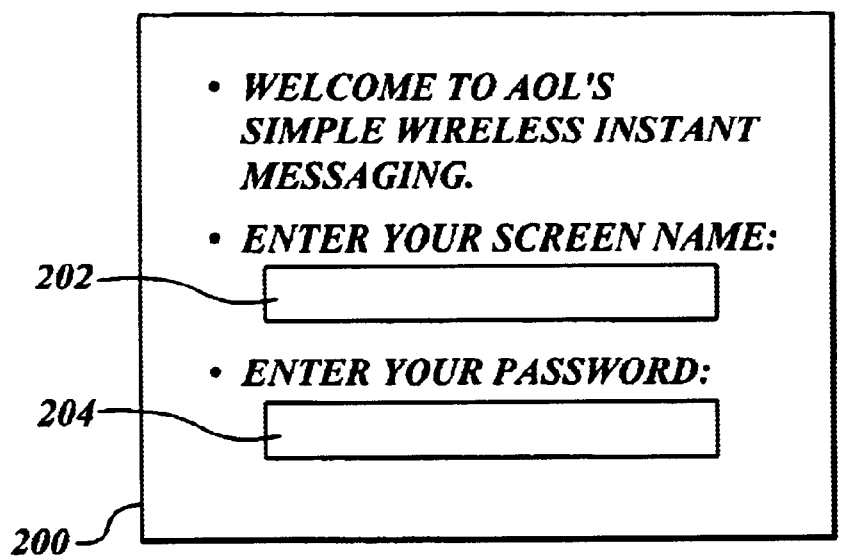
FIGS. 8 and 9 are screen shots of an example user interface for remotely entering instant message names.
Figure 9:
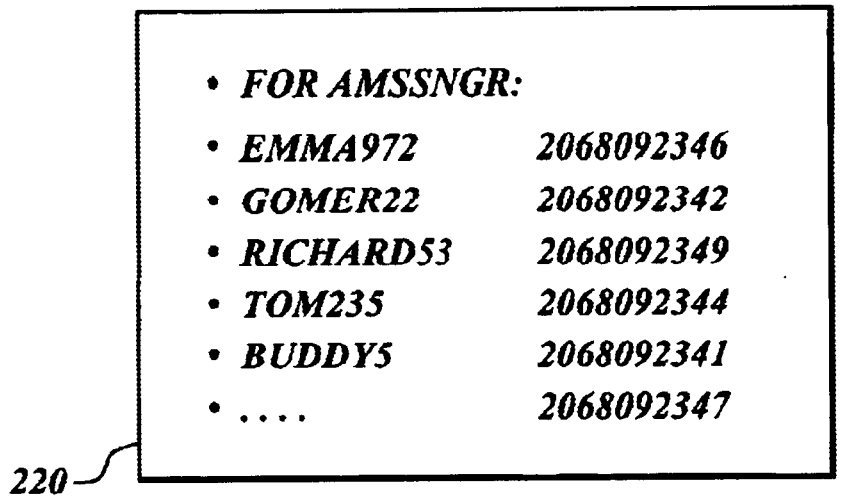

FIGS. 8–14 illustrate example user interfaces used for instant message name list creation (FIG. 2) and for mobile unit device interaction (FIGS. 3–7). As shown in FIG. 8, a wireless instant messaging sign on window 200 includes data fields for entry of the user's screen name 202 and password 204. The user's screen name and password are stored in one of the routing server 24 or the instant message server 40 as a result of a previously performed registration process. After the correct information is entered in the data fields 202 and 204, the user is provided access to various user wireless instant messaging information, such as user account information and an instant message name list interface, as shown in FIG. 9. The wireless instant messaging sign on window 200 is presented on a traditional system 42 that is coupled to the public or private data network 30. The traditional system 42 includes previously loaded software received from either the instant message routing server 24 or the instant message server 40 as a result of the registration process.

As shown in FIG. 9, an instant message name list window 220 is an interface that allows users interaction with the stored instant message name list. Each instant message name in the list corresponds to a phone number assigned to the instant message routing server 24. Through window 220 the user enters, deletes or reorders instant message names based on a comparison with the address book stored in the user's mobile unit device and the user's desired entries. The server 24 or 40 that hosts the window 220 assigns a phone number to each new instant message name entered by the user. The phone numbers assigned are selected from a pool of phone numbers specifically assigned for that purpose. After the user has entered any new instant message names into window 220, the user requests loading of the newly entered instant message names into the user's mobile unit device 36. The server 24 or 40 that hosts the window 220 then generates an instant message name entry executable program that is sent through the short message service center 32 and the mobile carrier 34 to the user's mobile unit device 36. When the user's mobile unit device 36 receives the executable program, the mobile unit device 36 executes the instant message name entry program and loads the newly entered names with corresponding phone numbers into the mobile unit device's address book stored in memory.

Figure 10:
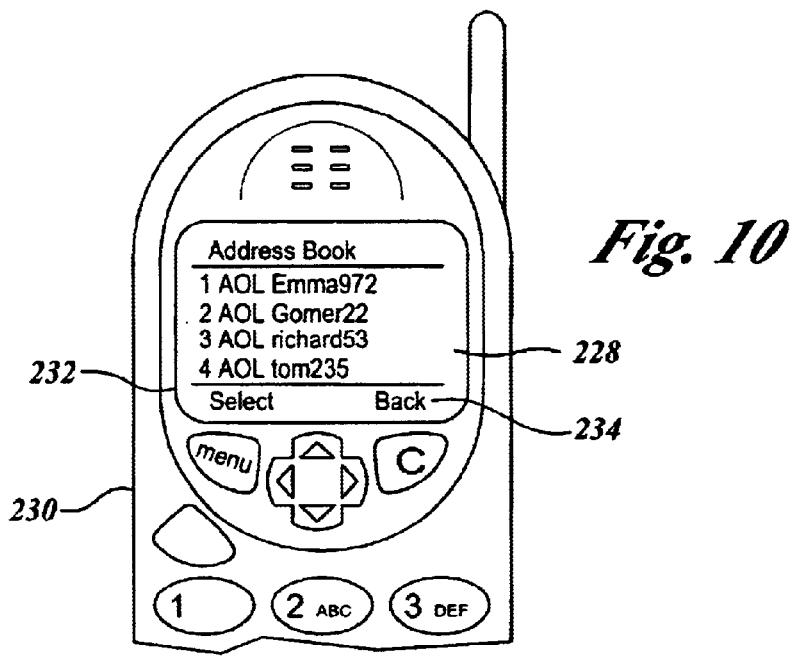
FIGS. 10–14 are diagrams of example user interfaces implemented on a cellular phone.

FIG. 10 shows a mobile unit device 230 with an example first address book user interface (ui) screen 228. The first address book ui screen 228 includes the instant message names stored in the first four locations in the mobile unit device's address book. The mobile unit device 230 includes on-screen and off-screen user interface control features (e.g. touch screen, cursor control, soft function keys). Two examples on-screen user interface control features are a "Select" 232 and a "Back" 234 function displayed at the bottom of the address book ui screen 228. In order for a user to send an instant message, the user selects a create message display screen, enters a text message using the mobile unit device's keypad, such as the T9® enabled keypad produced by Tegic Communications™, and then selects a recipient (an instant message name) from the address book ui screen. User activation of the "Select" function allows the user to select a user identified (e.g. highlighted) instant message name in the name list as the recipient of the entered instant message. User activation of the "Back" function allows the user to view the previously displayed ui screen.

Figure 11:
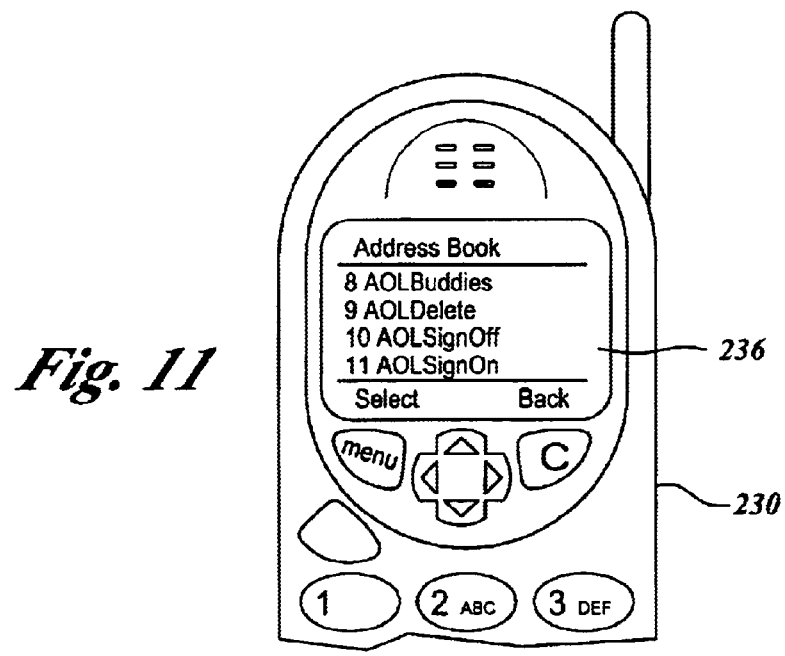
Figure 12:
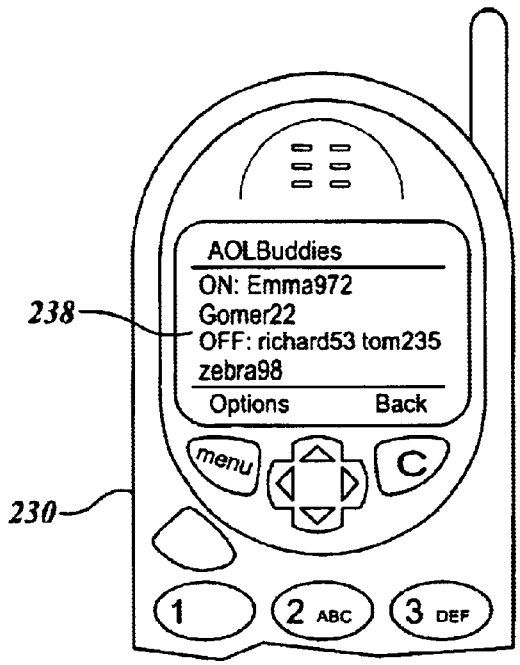
Figure 13:
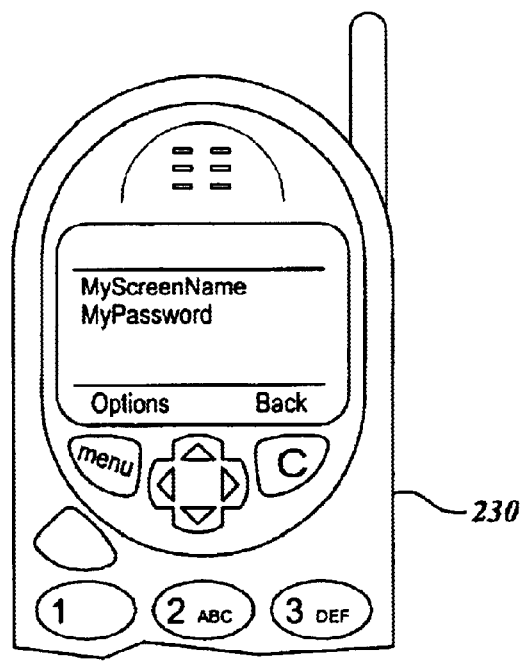

FIG. 11 shows an example second ui screen 236 of the address book. The second ui screen 236 shows address book locations occupied by the following instant message functions: update recipient (instant message name or buddy) availability; delete a recipient; sign off; sign on. When the user selects and sends the update recipient availability ("Buddies") function with any necessary predefined message content to the instant message routing server 24, the instant message routing server 24 checks availability of recipients (instant message names in the stored instant message name list) and sends the results back to the mobile unit device 230. FIG. 12 shows the results of an executed recipient update on the display of the mobile unit device 230. In display area 238, recipients Emma972 and Gomer22 are indicated as being on-line (i.e. signed on the instant message system). Richard53, tom235 and zebra 98 are indicated as being off-line (i.e. signed off the instant message system).

When the user selects and sends the "Delete" recipient function with the recipient's instant message name in the message content to the instant message routing server 24, the instant message routing server 24 deletes the included instant message name from the user's instant message name list stored in the database 22. Selection of the "SignOff" function commands the instant message routing server 24 to end the instant message session associated with the user. Selection of the "SignOn" function commands the instant message routing server 24 to initiate an instant message session with the instant message server 40 according to screen name and password information sent as message content to the instant message routing server 24, see FIG. 13. The "SignOn" function message content can be saved at the mobile unit device and reused for subsequent sign on requests. Alternatively, the instant message routing server 24 stores the user's instant message screen name and password and the phone number of the user's mobile unit device 36 to aid with automatic sign on.

Figure 14:
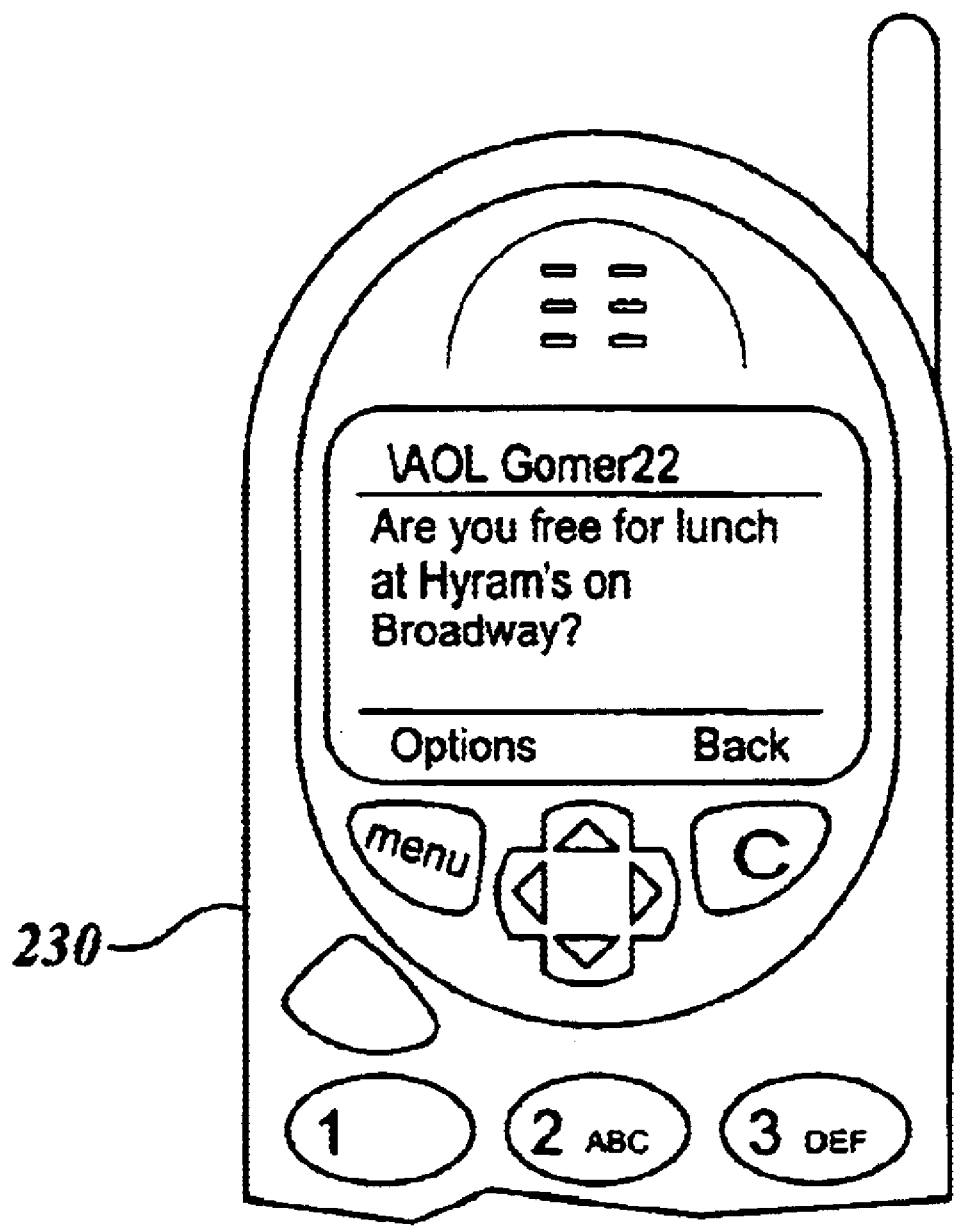

FIG. 14 shows how a received message appears on the mobile unit device 230. The message content of the received message is displayed with the instant message name of the originator of the received message.

As can be readily appreciated by those of ordinary skill in the art, the functions performed by the routing system 22 may be combined with the instant message server 40 or the short message service center 32. The short message service center 40 may be included in the mobile carrier infrastructure. Also, the functions of the components of the present invention may be distributed to multiple servers across one or more of the included networks.

While the presently preferred embodiment of the invention has been illustrated and described, it will be appreciated that various changes can be made therein without departing from the spirit and scope of the invention.

What is claimed is:

1. A method for instant text message communication, said method comprising:

sending an instant text message from a cellular communications device in wireless communication with components of a wireless environment that are coupled to an instant message system, said text message including a destination address, information associated with the cellular communications device's user, message content and message address;

according to information previously stored for the cellular communications device's user at the instant message system, if the destination address is associated with an instant message function, executing the associated instant message function at the instant message system using the information contained in the message content, if required as determined by the associated instant message function; and if the destination address is associated with an instant message user name, creating an instant text message comprising the message content and sending the created instant text message to the associated instant message name.

2. The method of claim 1, wherein if said instant message function is a sign on function, initiating an instant message session according to prestored user profile information and the message content.

3. The method of claim 2, wherein the message content is an instant message name associated with the user of the mobile unit device and a predefined password.

4. The method of claim 1, further comprising:

determining status information of users associated with instant message names stored for the user of the mobile unit device in the instant message system;

sending the determined status information to the mobile unit device of the user; and presenting at the user's mobile unit device the sent status information.

5. The method of claim 1, wherein if said instant message function is a sign off function, ending the instant message session associated with the mobile unit device's user.

6. The method of claim 1, wherein if said instant message function is a delete instant message name function, deleting at least one stored instant message name according to the message content.

7. The method of claim 6, wherein the message content is at least one instant message name.

8. The method of claim 1, wherein if said instant message function is an update instant message name function, determining status information of users associated with instant message names stored for the user of the cellular communications device, sending the determined status information to the cellular communications device of the user, and presenting at the user's cellular communications device the sent status information.

9. The method of claim 1, further comprising:

associating, at the instant message system, an instant message name to a destination address;

saving the association in memory of the instant message system according to a registered user of a mobile unit device;

generating an executable address loading program according to the saved association;

sending the generated executable address loading program through the wireless environment to the mobile unit device of the registered user; and entering the associated instant message name and address into memory of the mobile unit device of the registered user by executing the sent executable address loading program.

10. The method of claim 1, further comprising:

associating, at the instant message system, an instant message name to a destination address;

saving the association in memory of the instant message system according to a registered user of a mobile unit device; and entering the associated instant message name and address into memory of the mobile unit device of the registered user.

11. The method of claim 1, further comprising:

receiving an instant text message from a user device for a user signed on through a cellular communications device;

processing the received instant text message according to the stored user information and sending the processed instant text message as a text message through the wireless environment to the cellular communications device of the user; and presenting at the user's cellular communications device the sent instant text message and the instant message name of the creator of the instant text message.

12. A system for sending and receiving instant text messages between at least one cellular communications device coupled to a wireless network and a computer based device coupled to a public data network, said system comprising:

a database comprising a plurality of user profiles, each of the plurality of user profiles comprises user identification information and at least one of an instant message name or an instant message function assigned to a user destination address;

a mobile carrier in communication with the at least one cellular communications device for receiving an instant text message signal from a cellular communications device, said received instant text message signal comprises a destination address, information associated with the cellular communications device's user, message content and message address and processing the instant text message signal according the message address;

a routing server coupled to the database and in communication with the mobile carrier for receiving the processed instant text message signal from the mobile carrier;

if the destination address is assigned to an instant message function, executing the assigned instant message function with an instant message server through the public data network according to the information contained in the message content, if required as determined by the instant message function; and if the destination address is assigned to an instant message user name, creating an instant text message comprising the message content for delivery to the assigned instant message name and sending the created instant text message to the user associated with the instant message name through the instant message server.

13. The system of claim 12, wherein said mobile carrier comprises a short message service center for converting information between a wireless protocol and a message delivery protocol.

14. The system of claim 12, wherein said routing server receives from the instant message system an instant text message for a user signed on through a cellular communications device, processes the received instant text message according to user information stored at the instant message system and sending the processed instant text message as a text message through the wireless environment to the cellular communications device of the user and presents at the user's cellular communications device the sent text message and the instant message name of the creator of the instant message.

15. A communication system between a cellular communications device and one or more devices coupled to an instant messaging system, the system comprising:

one or more cellular communications devices for generating a text message, the text message comprises text message content, instant text message address information, and sender information, and sending the generated text message to a wireless router; and the instant messaging system comprises:
a database comprising a plurality of user profiles; and
a processor for receiving the sent text message from the one or more cellular communications devices via the wireless router, generating an instant text message of the received message based on the text message content, instant message user address information, associated user profile, and sender information, and sending the generated instant text message to a destination based on the instant message user address information.

16. The system of claim 15, wherein the instant messaging system further receives an instant text message with instant message user address information from a device coupled to the instant messaging system, determines the destination of the received instant text message based on the instant message address information, and if as a text message the determined destination is a cellular communications device, prepares the received instant text message for delivery via the wireless router to the cellular communications device, and sends the text message through the wireless network to the cellular communications device.

* * * * *